(12) United States Patent
Yi et al.

(10) Patent No.: US 8,744,433 B2
(45) Date of Patent: *Jun. 3, 2014

(54) MOBILE COMMUNICATION METHOD AND SYSTEM

(75) Inventors: Seung June Yi, Seoul (KR); Woon Young Yeo, Gyeonggi-do (KR); So Young Lee, Gyeonggi-do (KR)

(73) Assignee: Thomson Licensing, Issy les Moulineaux (FR)

( * ) Notice: Subject to any disclaimer, the term of this patent is extended or adjusted under 35 U.S.C. 154(b) by 1004 days.

This patent is subject to a terminal disclaimer.

(21) Appl. No.: 12/292,558

(22) Filed: Nov. 20, 2008

(65) Prior Publication Data

US 2009/0104924 A1    Apr. 23, 2009

Related U.S. Application Data

(63) Continuation of application No. 12/120,903, filed on May 15, 2008, which is a continuation of application No. 10/407,950, filed on Apr. 7, 2003, now Pat. No. 7,400,893.

(30) Foreign Application Priority Data

Apr. 8, 2002    (KR) .................................. 2002-18888

(51) Int. Cl.
   *H04W 40/00*    (2009.01)
(52) U.S. Cl.
   USPC ........ 455/428; 455/422.1; 455/464; 370/310; 370/328; 370/329; 370/338

(58) Field of Classification Search
   USPC ............... 455/422.1, 428, 464; 370/310, 328, 370/329, 338
   See application file for complete search history.

(56) References Cited

U.S. PATENT DOCUMENTS

| 5,757,792 | A  | 5/1998 | Aoki |
| 6,757,245 | B1 | 6/2004 | Kuusinen et al. |
| 6,857,095 | B2 | 2/2005 | Suumaki et al. |
| 7,095,722 | B1 | 8/2006 | Walke et al. |
| 7,165,112 | B2 | 1/2007 | Battin et al. |
| 7,400,893 | B2 | 7/2008 | Yi et al. |

(Continued)

FOREIGN PATENT DOCUMENTS

| EP | 1030484 | 8/2000 |
| EP | 1 128 646 | 7/2006 |

(Continued)

OTHER PUBLICATIONS

"The layered approach: The OSI Model" Data and Computer Communications, Jan. 1, 1991, pp. 446-456. XP000917810.

(Continued)

*Primary Examiner* — Wayne Cai
(74) *Attorney, Agent, or Firm* — Robert D. Shedd

(57) ABSTRACT

In the method for wireless communication between a terminal and a base station supporting a real time packet transfer service mode and reliable packet transfer service mode according to the present invention, one of the real time packet transfer service mode and reliable packet transfer service mode is selected and a communication channel between the terminal and the base station is established, and the packet data are bidirectionally exchanged between the terminal and the base station over the communication channel in real time.

14 Claims, 8 Drawing Sheets

(56) References Cited

U.S. PATENT DOCUMENTS

| | | | |
|---|---|---|---|
| 7,751,441 B2* | 7/2010 | Beckmann et al. | 370/474 |
| 2001/0007137 A1 | 7/2001 | Suumaki et al. | |
| 2001/0029188 A1 | 10/2001 | Sarkkinen et al. | |
| 2002/0094814 A1* | 7/2002 | Wigell et al. | 455/436 |
| 2004/0004947 A1* | 1/2004 | Herrmann et al. | 370/338 |

FOREIGN PATENT DOCUMENTS

| | | |
|---|---|---|
| JP | 2002-101112 A | 4/2002 |
| KR | 2002-0069991 | 9/2002 |
| RU | 2114518 | 6/1998 |
| WO | WO 94/11993 | 5/1994 |
| WO | WO 01/50789 A1 | 7/2001 |
| WO | WO 01/60017 A1 | 8/2001 |
| WO | WO 01/61899 A1 | 8/2001 |
| WO | WO 02/01895 A1 | 1/2002 |

OTHER PUBLICATIONS

Conway A.E.: "Performance modeling of multi-layered OSI communication architectures" Jun. 11, 1989, pp. 651-657. XP10081154.

Schniedenharn, J.; et al., "UTRA TDD protocol operation," The 11$^{th}$ IEEE International Symposium on Personal, Indoor and Mobile Radio Communications, 2000. PIMRC 2000, vol. 2, pp. 1226-1230.

Schniedenharn, J.; et al., "Layer 2 and layer 3 of UTRA-TDD," IEEE 51$^{st}$ Vehicular Technology Conference Proceedings, 2000. VTC 2000-Spring, Tokyo, vol. 2 (pp. 1181-1185).

Fabri, S. et al., "Robust Header compression for real-time services in cellular networks," Second International Conference on 3G Mobile Communication Technologies, 2001. (Conf. Publn. No. 477) (pp. 124-128).

Camarada, P. et al., "ROHC+: a new header compression scheme to TCP streams in 3G wireless systems," IEEE International Conference on Communications, 2002, vol. 5, (pp. 3271-3278).

Wang et al., "On Implementation and improvement of robust header compression in UMT's," 13$^{th}$ IEEE International Symposium on Personal, Indoor and Mobile Radio Communications, 2002, vol. 3, (pp. 1151-1155).

Clanton, C., et al., "Efficient and robust header compression for real-time services," IEEE Wireless Communications and Networking Conference, 2000, vol. 2 (pp. 924-928).

* cited by examiner

MOBILE COMMUNICATION METHOD AND SYSTEM

CROSS-REFERENCE TO RELATED APPLICATIONS

This application claims the benefit of, and is a continuation of, U.S. application Ser. No. 12/120,903, filed May 15, 2008, which is a continuation of U.S. application Ser. No. 10/407,950, filed Apr. 7, 2003, now U.S. Pat. No. 7,400,893, and claims priority to Republic of Korea Patent Application No. 18888/2002, filed Apr. 8, 2002, each of which are hereby incorporated by reference for all purposes as if fully set forth herein.

BACKGROUND OF THE INVENTION

1. Field of the Invention

The present invention relates to a mobile communication system and, more particularly, to an improved mobile communication method and system for supporting a bidirectional real time communication services.

2. Description of the Background Art

A universal mobile telecommunications system (UMTS) is a third generation mobile communication system that has evolved from a standard known as Global System for Mobile communications (GSM). This standard is a European standard which aims to provide an improved mobile communication service based on a GSM core network and wideband code division multiple access (W-CDMA) technology. In December, 1998, the ETSI of Europe, the ARIB/TTC of Japan, the TI of the United States, and the TTA of Korea formed a Third Generation Partnership Project (3GPP) for the purpose of creating the specification for standardizing the UMTS.

The work towards standardizing the UMTS performed by the 3GPP has resulted in the formation of five technical specification groups (TSG), each of which is directed to forming network elements having independent operations. More specifically, each TSG develops, approves, and manages a standard specification in a related region. Among them, a radio access network (RAN) group (TSG-RAN) develops a specification for the function, items desired, and interface of a UMTS terrestrial radio access network (UTRAN), which is a new RAN for supporting a W-CDMA access technology in the UMTS.

The TSG-RAN group includes a plenary group and four working groups. Working group 1 (WG1) develops a specification for a physical layer (a first layer). Working group 2 (WG2) specifies the functions of a data link layer (a second layer) and a network layer (a third layer). Working group 3 (WG3) defines a specification for an interface among a base station in the UTRAN, a radio network controller (RNC), and a core network. Finally, Working group 4 (WG4) discusses requirements desired for evaluation of radio link performance items desired for radio resource management.

FIG. 1 is a block diagram illustrating a general UMTS architecture. The UMTS is roughly divided into a terminal 10, UTRAN 20 and core network 30.

The UTRAN 20 includes one or more radio network subsystems (RNS) 25. Each RNS 25 includes an RNC 23 and one or more Node Bs 21 managed by the RNCs.

Node Bs are managed by the RNCs, receive information sent by the physical layer of a terminal 10 (e.g., mobile station, user equipment and/or subscriber unit) through an uplink, and transmit data to a terminal 10 through a downlink. Node Bs, thus, operate as access points of the UTRAN for terminal 10.

The RNCs perform functions which include assigning and managing radio resources, and operate as an access point with respect to the core network 30.

The services provided to the specific terminal 10 is roughly divided into a circuit switched service and a packet switched service. For example, a general voice phone call service belongs to the circuit switched service, while a Web browsing service through an Internet connection is classified as the packet switched service.

In case of supporting the circuit switched service, the RNC 20 is connected to the MSC 31 of the core network 30, and the MSC 31 is connected to a Gateway Mobile Switching Center (GMSC) 33 managing a connection to other networks.

Meanwhile, in case of the packet switched service, services are provided by a Serving GPRS Support Node (SGSN) 35 and a Gateway GPRS Support Node (GGSN) 37 of the core network 30.

The SGSN 35 supports a packet communication going toward the RNC 23, and the GGSN 37 manages connection to other packet switched networks such as the Internet.

An interface exists between various network components to allow the network components to give and take information to and from each other for a mutual communication. A cable interface between the RNC 23 and the core network 30 is defined as an Iu interface.

Connection of the Iu interface to the packet switched area is defined as an Iu-PS, and connection of the Iu interface to the circuit switched area is defined as an Iu-CS.

A radio access interface between the terminal 10 and the UTRAN 20 is defined as a Uu interface.

FIG. 2 is a block diagram illustrating a layered radio interface protocol architecture adopted to the Uu interface in FIG. 1. The radio access interface protocol is vertically formed of a physical layer (PHY), a data link layer, and a network layer and is horizontally divided into a control plane for transmitting control information and a user plane for transmitting data information. The user plane is a region to which traffic information of a user such as voice or an IP packet is transmitted. The control plane is a region to which control information such as an interface of a network or maintenance and management of a call is transmitted.

In FIG. 2, protocol layers can be divided into a first layer (physical layer: PHY: L1), a second layer (data link layer: MAC, RLC, and PDCP: L2), and a third layer (network layer: RRC: L3) based on three lower layers of an open system interconnection (OSI) reference model well known in a communication system.

The first layer provides an information transfer service to MAC and higher layers using various radio transfer techniques.

The first layer is connected to the MAC layer through transport channels (TrCHs), and data are transferred between the MAC layer and the PHY layer through the transport channels.

The MAC layer provides a radio resource and MAC parameter reallocation services.

The MAC layer provides data transfer services to the radio link control (RLC) layer through logical channels, and various logical channels are provided for the kinds of data transfer services as offered by MAC.

Each logical channel type is defined by what type of information is transferred. In general, the control plane information is transferred using control channels and user plane information is transferred using traffic channels.

The RLC layer supports reliable data transmission and performs segmentation and reassembly functions of variable-length upper layer PDUs (RLC SDUs) into/from smaller RLC PDUs.

The RLC SDU delivered from the upper layer is segmented into appropriated size and added by header information so as to be transferred to the MAC layer in the form of RLC PDU. The RLC PDUs are temporally stored in an RLC buffer located in the RLC layer The packet data convergence protocol (PDCP) layer is located above the RLC layer. A data stream using a network protocol such as an IPv4 (internet Protocol version 4) or an IPv6 (internet Protocol version 6) can be transmitted effectively through the radio interface of a relatively narrow bandwidth by virtue of the PDCP layer.

For this purpose, the PDCP layer performs a function of header compression and decompression using an RFC2507 protocol or RFC3095 (Robust Header Compression ROHC) protocol defined by the Internet Engineering Task Force (IETF).

With such header compression techniques, only information required for the header part is transmitted so that less control information can be transmitted and thus the amount of data to be transmitted can be reduced.

The RRC layer positioned in the lowest portion of the third layer is defined only in the control plane and controls the transport channels and the physical channels in relation to the setup, the reconfiguration and the release of the radio bearers (RBs).

Here, the RB means a service provided by the second layer for data communication between the terminal 10 and the UTRAN 20, and setting up of the RB means processes of stipulating the characteristics of a protocol layer and a channel, which are required for providing a specific service, and setting the respective detailed parameters and operation methods.

For reference, the RLC layer can be included in the user plane and the control plane according to a layer connected to the upper layer. When the RLC layer belongs to the control plane, the data are received from a radio resource control (RRC) layer. In the other cases, the RLC layer belongs to the user plane.

As shown in FIG. 2, in case of the RLC layer and the PDCP layer, a plurality of entities can exist in one layer. This is because one terminal 10 has a plurality of RBs, and only one RLC entity and only one PDCP entity are generally used for one RB.

The RLC layer will now be described in detail.

The RLC layer can perform functions of segmentation and reassembly for the RLC SDU received from the upper layer. After segmentation and reassembly, the RLC layer can add an RLC header to an RLC payload to construct an RLC PDU.

A header of the RLC PDU may contain a sequence number assigned thereto in the transmitted order of RLC PDUs such that the RLC layer of the receiver checks the sequence number of the received RLC PDU and requests retransmission of the lost RLC PDU from the RLC layer of the transmitter, if any.

There are three operation modes for the RLC layer according to functions required by the upper layer, and the RLC layer processes the RLC SDUs according to the operation mode selected.

The three operation modes are a transparent mode (TM), an unacknowledged mode (UM), and an acknowledge mode (AM).

When an RLC entity operates in TM, the RLC entity does not add any header information to the RLC SDU received from the upper layer.

In general, the RLC entity operating in TM does not use the functions of segmentation and reassembly, and thereby, the RLC SDU received from the upper layer is transmitted as it is received. However, if the segmentation function is configured by upper layers the RLC entity segments the RLC SDU into several RLC PDUs. In the case that the RLC SDU is segmented and transferred, RLC PDUs derived from one RLC SDU are to be simultaneously transferred.

When the RLC entity operates in UM, the RLC entity segments the RLC SDU into UMD PDUs of appropriate size if the RLC SDU is larger than the length of available space in the UMD PDU.

Each RLC PDU includes header information so that the RLC layer of the receiver can restore the RLC SDU from the RLC PDUs, and the header information may indicate a position where the RLC SDU ends or contain a sequence number of the RLC PDU.

However, the RLC entity does not retransmit the lost RLC PDU in the UM, even if the receiver does not receive the RLC PDU. That is, the RLC entity of the receiver does not request retransmission of the RLC PDU when it does not receive the RLC PDU or the received RLC PDU is erroneous, and the RLC entity of the transmitter does not duplicate the RLC PDU for retransmission purpose.

Services that can be supported in UM are a cell broadcast service, a voice over IP (VoIP) using an IP network, etc.

Meanwhile, when the RLC layer operates in AM, the RLC entity supports retransmission of RLC PDU when transmission failure occurs.

Whether or not the RLC PDU has been successfully transmitted can be determined by checking the sequence number in the header information of the RLC PDU. If RLC PDU has been lost or erroneous, the RLC entity of the receiver transmits status information (status PDU) indicating the sequences numbers of the lost or erroneous RLC PDU to the transmitter.

When the RLC layer is operated in AM, various timers and counters are defined for an effective retransmission of packets. The timers can be driven after a specific RLC PDU is transmitted, and if no acknowledgement is received in a predetermined time, the RLC entity discards duplicate of RLC PDU and performs a procedure scheduled for this case.

The counter increases by 1 whenever the RLC PDU is transmitted. If no acknowledgement is received in response to RLC PDU even after the counter exceeds a predetermined value, the RLC layer discard the duplicate of the RLC PDU and performs a procedure scheduled for this case.

The RLC entities of the transmitter and receiver set a range of sequence numbers of the RLC PDUs to be transmitted and received, and defines a transmission and reception windows on the basis of the range.

The RLC entity of the transmitter can transmit only the RLC PDUs as much as a window size of the transmission window and the RLC entity of the receiver can adjust or update the window size of a transmission window according to status information to be sent to the transmitter.

The RLC entity of the receiver receives the RLC PDUs as much as the window size of the reception window and discard the RLC PDUs beyond the window size of the reception window.

FIG. 3 is a block diagram illustrating RLC layer of the layered radio interface protocol architecture of FIG. 2.

As described above, a plurality of RLC entities can be activated in the RLC layer, and each RLC entity operates in one of TM, UM, and AM.

When the RLC entity operates in TM or UM, the data transfer is unidirectional as shown in FIG. 3. That is, one RLC entity can only transmit or receive the data in TM or UM, because the retransmission function is not supported in TM or UM.

On the other hand, when the RLC entity operates in AM, the data transfer is bidirectional. This means that the peer AM RLC entities utilizes status information which reports sequence numbers indicating the lost PDUs or erroneous PDUs. That is, the AM RLC entity can simultaneously transmit and receive the data, which means that the AM RLC entity can receive the status information from the receiver while it transmits packets to the receiver.

In detail, since the AM RLC entity includes both a transmission (Tx) module and a reception (Rx) module, it is not defined as the term of a transmission RLC entity or a reception RLC entity like in TM or UM.

In addition, generally, one RB is mapped to one RLC entity, an RB service can be bidirectional or unidirectional according to an operation mode of the RLC entity of the lower layer.

How the packets (RLC PDU) are transferred in respective modes will be described hereinafter in more detail.

In case of TM or UM, the RLC entity of the transmitter does not support retransmission function such that the peer RLC entity of the receiver transfers the packets to an upper layer upon receiving it. However, in case of AM, the AM RLC entity supports an in-sequence delivery function in that packets are sequentially delivered to the upper layer, so that processing delay occurs for reordering the received packets in the order of the transmitted sequence.

The in-sequence delivery function refers to a function of delivering RLC PDUs containing the RLC SDU data to the upper layer in the order that the RLC entity of the transmitter has transmitted them. The RLC entity of the receiver acknowledges successful reception or requests retransmission of the missing PDUs by sending one or more status PDUs to the AM RLC peer entity through its transmitting side. Once a complete RLC SDU has been received, the associated PDUs are reassembled and then delivered to the upper layers through an AM service access point (AM SAP).

Meanwhile, in order to support an effective real time packet transmission, the PDCP layer is defined for the packet switching (PS) domain. Every PS domain radio access bearer (RAB) is associated with one radio bearer (RB), which is in turn is associated with one PDCP entity. Each PDCP entity is associated with one RLC entity.

Every PDCP entity uses zero, one, or several different header compression protocols. Here, the Robust Header Compression (ROHC) protocol is exemplary adopted as a header compressor.

The ROHC is generally used to compress or decompress header information of the Real-time transport protocol/User Datagram Protocol/Internet Protocol (RTP/UDP/IP) packet at the transmitting and receiving entity, respectively.

The RTP/UDP/IP packet refers to a packet containing header information added thereto while the user data passes the RTP, UDP, and IP. The packet header includes various information required for routing to the destination and recovering the transmitted data at the receiver.

The RTP protocol is used to supplement a problem when real time traffic such as a Voice over IP (VoIP) and streaming service is transmitted using the UDP/IP protocol layers. The UDP is one of transport layer protocols over IP and supports connectionless data transfer service unlike the Transmission Control Protocol (TCP) which supports connection-oriented service with the retransmission or flow control functions.

IP is a network layer protocol in terms of OSI reference model and is responsible for moving data packet from node to node based on a destination IP address contained in the packet header. The IP supports best effort delivery service so as to try to forward the packets to the destination but not guaranteed successful delivery.

ROHC operates based on the fact that there is significant redundancy between header fields, both within the same packet header but in particular between consecutive packets belonging to the dame packet stream. By sending static field information only initially and utilizing dependencies and predictability for other field, the header size can be significantly reduced for most packets.

For reference a RTP/UDP/IP packet has an IP (IPv4) header of 20 octets, a UDP header of 8 octets, and an RTP header of 12 octets for a total of 40 octets. With IPv6, the IP header is 40 octets for a total of 60 octets. The size of the payload depends on the coding and frame sizes being used and is as low as 15 to 20 octets.

From these numbers, the need for reducing header sizes for efficiency is obvious. Using the ROHC, the header size can be significantly reduced as much as 1 to 3 octets.

The ROHC has three modes of operation, called Unidirectional mode (U mode), Bidirectional Optimistic mode (O mode), and Bidirectional Reliable mode (R mode).

When the ROHC operates in U mode, packets are sent in one direction only, i.e., from compressor to decompressor. On the other hand, when the ROHC operates in O or R modes, packets are sent in two directions, i.e., a feedback channel is used to send error recovery requests and acknowledgement of significant context updates from decompressor to compressor.

O mode aims to maximize compression efficiency and sparse usage of the feedback channel so as to reduce the number of damaged headers delivered to the upper layers due to residual errors or context invalidation.

R mode aims to maximize robustness against loss propagation and damage propagation, i.e., minimizes the probability of context invalidation, even under header loss/error burst conditions.

FIG. 4 is a block diagram for illustrating peer-to-peer communication between RLC entities operating in UM.

Since the ROHC compressor and decompressor of PDCP peer entities communicates through a unidirectional link in U mode, each PDCP entity at the transmitter and receiver is mapped to one TM or UM LRC entity.

In FIG. 4, a receiver (UTRAN or UE) and a transmitter (UTRAN or UE) communicate through a Uu interface. A PDCP entity at the transmitter is mapped to a transmit UM RLC (Tx UM RLC) entity through a UM SAP and operates a transmit ROHC (Tx ROHC) in U mode. Also, a peer PDCP entity at the receiver is mapped to one receive UM RLC (Rx UM RLC) entity through a UM SAP.

When a PDCP SDU is received from upper layers, the PDCP entity at the transmitter performs header compression using the Tx ROHC upon reception of the PDCP SDU and submit the PDCP PDU to the Tx UM RLC entity through the UM SAP in the sequence received from the upper layer. On the other hand, when the PDCP entity at the receiver receives the PDCP PDU from the Rx UM RLC entity through the UM SAP, it performs header decompression of the PDCP PDU using the Rx ROHC to obtain the PDCP SDU and delivers the recovered PDCP SDU to the upper layer in the order received from the UM RLC entity.

When the PDCP entities at the transmitter and receiver are mapped to respective Tx and Rx TM RLC entities, the transmitter and receiver operate in the similar manner as in UM.

FIG. 5 is a block diagram illustrating a PDCP entity-RLC entities-mapping structure in which the RLC entity operates in AM.

Unlike UM and TM RLC entities, the AM RLC entity can be configured to utilize one or two logical channels so as to transmit and receive at the same time. Accordingly, the AM RLC entities at the transmitter and receiver have the same structure and the AM RLC entity at the transmitter will be exemplary described hereinbelow.

In FIG. 5, a PDCP entity is mapped to an AM RLC entity through an AM SAP. The PDCP entity operates in O mode or R mode (O/R mode) and also the AM RLC entity operates a Tx RLC module and a Rx RLC module, which means that the PDCP entity activates a Tx ROHC module and an Rx ROHC module.

When a PDCP SDU is received from upper layers, the PDCP entity performs header compression using the Tx ROHC module upon reception of the PDCP SDU and submit the PDCP PDU to the Tx RLC module of the AM RLC entity so as to transfer to a transmit side logical channel. On the other hand, when an RLC PDU is received through a receive side logical channel, the Rx RLC module of the RLC entity processes the RLC PDU and then delivers the RLC SDU (PDCP PDU) to the Rx ROHC module of the PDCP entity through the AM SAP. The Rx ROHC module performs header decompression of the PDCP PDU and delivers the PDCP SDU to the upper layer in the order received from the AM RLC entity.

In order for the ROHC to efficiently operate, PDCP PDUs need to be quickly transferred from the RLC entity to the PDCP entity. In this respect, the PDCP entity efficiently operates when the PDCP entity is mapped to the TM/UM RLC entity since the RLC entity delivers the RLC SDUs to the PDCP entity upon receiving the RLC SDUs (PDCP PDUs).

However, when the PDCP entity is mapped to one AM RLC entity, the PDCP entity can not operate well, (i.e., in real time) since the AM entity always operates the retransmission function, in which the RLC PDUs can not be delivered to the PDCP entity until a complete RLC SDU has been received.

Actually, the length of the radio frame specified in UMTS is 10 ms, the time taken by the radio frame to reach the receiver is over 50 ms in consideration of the propagation delay and processing delay at the transmitter and receiver.

Typically, maximum tolerable delay time for supporting the voice telephony or streaming services is 80 ms. Accordingly, if a packet belonged to the radio frame is required to be retransmitted only one time, the total delay for delivering the packet to the upper layer exceed the maximum tolerable delay time. Thus, mapping the PDCP entity operating the ROHC in O/R mode to the AM RLC entity results in degradation of the real time service quality.

Furthermore, the data communication method has a drawback in that since the one PDCP entity can be mapped to only one TM/UM RLC entity, which operates in only one direction, for supporting real time services, it is impossible to support real time bidirectional services.

SUMMARY OF THE INVENTION

The present invention has been made in an effort to solve the above problems.

It is an object of the present invention to provide an improved wireless communication method and system capable of bidirectionally communicating packet data between a terminal and a base station while the system operates in a transparent mode (TM) or unacknowledged mode (UM).

It is another object of the present invention to provide an improved wireless communication method and system capable of simultaneously communicating packet data between a terminal and a base station in real time while the system operates in an acknowledged mode (AM).

It is still another object of the present invention to provide an improved wireless communication method and system capable of bidirectionally communicating packet data between a terminal and a base station in real time in all of the packet data transfer modes supported by the system.

To achieve the above objects, the method for wireless communication between a terminal and a base station supporting a real time packet transfer service mode and reliable packet transfer service mode, comprises selecting one of the real time packet transfer service mode and reliable packet transfer service mode, establishing a communication channel between the terminal and the base station, and transmitting, receiving, or simultaneously transmitting and receiving packet data in real time.

The communication channel establishment includes configuring a packet data convergence protocol (PDCP) entity located in a PDCP layer, the PDCP entity being associated with at least one radio bearer, configuring at least one radio link control (RLC) entity located in an RLC layer, and mapping the RLC entity to two logical channels.

The PDCP entity is provided with a header compression function and the header compression function enables a header compressor and header decompressor according to characteristics of the radio bearer.

The header compressor performs header compression upon reception of the packet data from upper layers through the radio bearer so as to generate a compressed header packet and the header decompressor performs header decompression upon reception of a compressed header packet from the RLC entity.

In one aspect of the present invention, the PDCP entity is mapped to one RLC entity. The RLC entity has a transmit side module which transmits the compressed packet from the PDCP entity through one of the logical channels and a receive side module which receives the packet from the lower layer through the other of the logical channels.

The header compressor is mapped to the transmit side module through a service access point and the header decompressor is mapped to the receive side module through the service access point.

In another aspect of the present invention, the RLC entity disables a packet retransmission function.

In another aspect of the present invention, the PDCP entity is mapped to two RLC entities.

The PDCP entity is associated with one radio bearer and one of the two RLC entities is responsible for transmission of the packet received from the PDCP entity through one of the two logical channels and the other is responsible for reception of the packet through the other logical channel.

The header compressor and header decompressor are mapped to different RLC entities through different service access points, the RLC entities being respectively responsible for transmission and reception of the packet.

In still another aspect of the present invention the PDCP entity is associated with two radio bearers of which each has a unidirectional characteristic.

The PDCP entity is mapped to two RLC entities and one of the two RLC entities is responsible for transmission of the packet through one of the two logical channels and the other is responsible for reception of the packet through the other logical channel.

The header compressor and header decompressor are mapped to different RLC entities through different service access points, the RLC entities being respectively responsible for transmission and reception of the packet.

To achieve the above objects, the wireless communication system having at least one communication channel between a terminal and a base station, each of the terminal and base station, according to the present invention, comprises a mode selector which selects one of a real time packet transfer service mode and a reliable packet transfer service mode according to characteristics of a service to be provided to upper layers, and a channel configuring unit which configures the channel between the terminal and the base station based on the service mode selected by the mode selector, wherein the channel configuring unit configures the channel over which the terminal and the base station bidirectionally exchange packets in both the real time packet transfer service mode and a reliable packet transfer service mode.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Preferred embodiments of the present invention will be described hereinafter with reference to the accompanying drawings.

Figure 1:
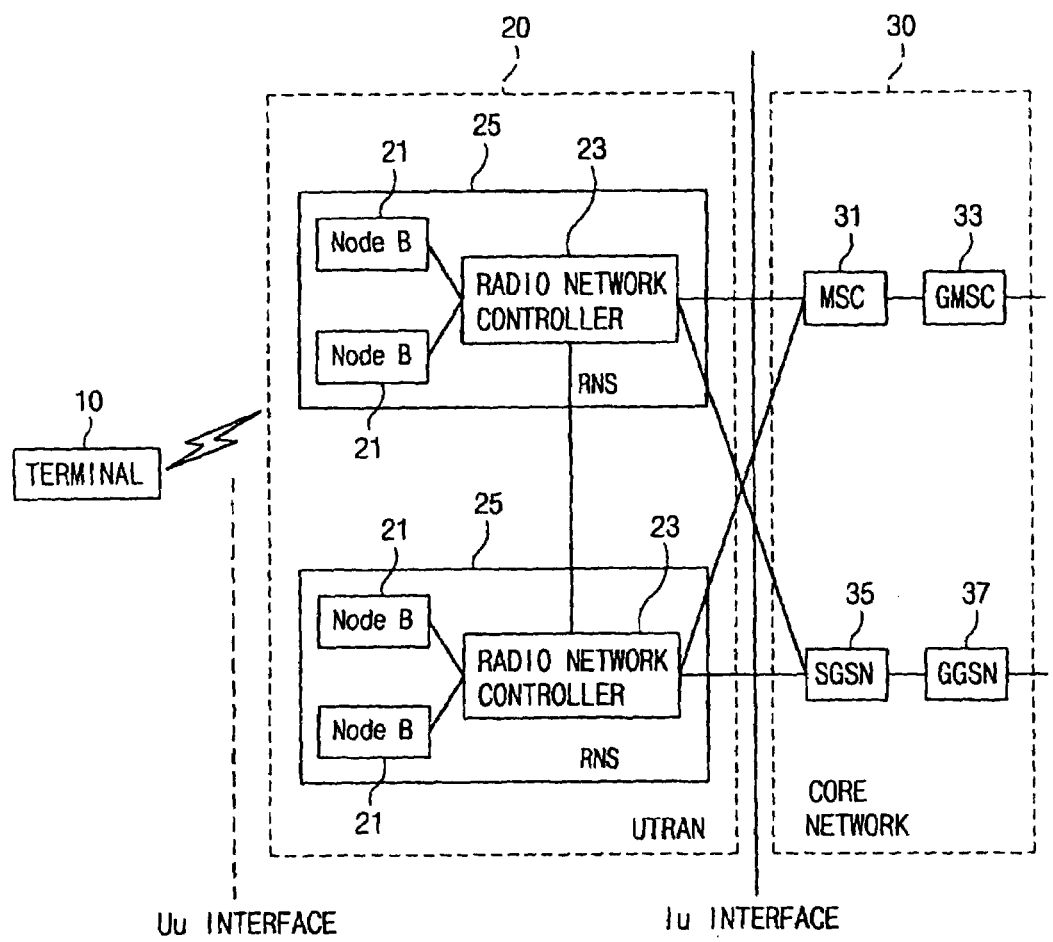
FIG. 1 is a block diagram illustrating a general UMTS architecture.
Figure 2:
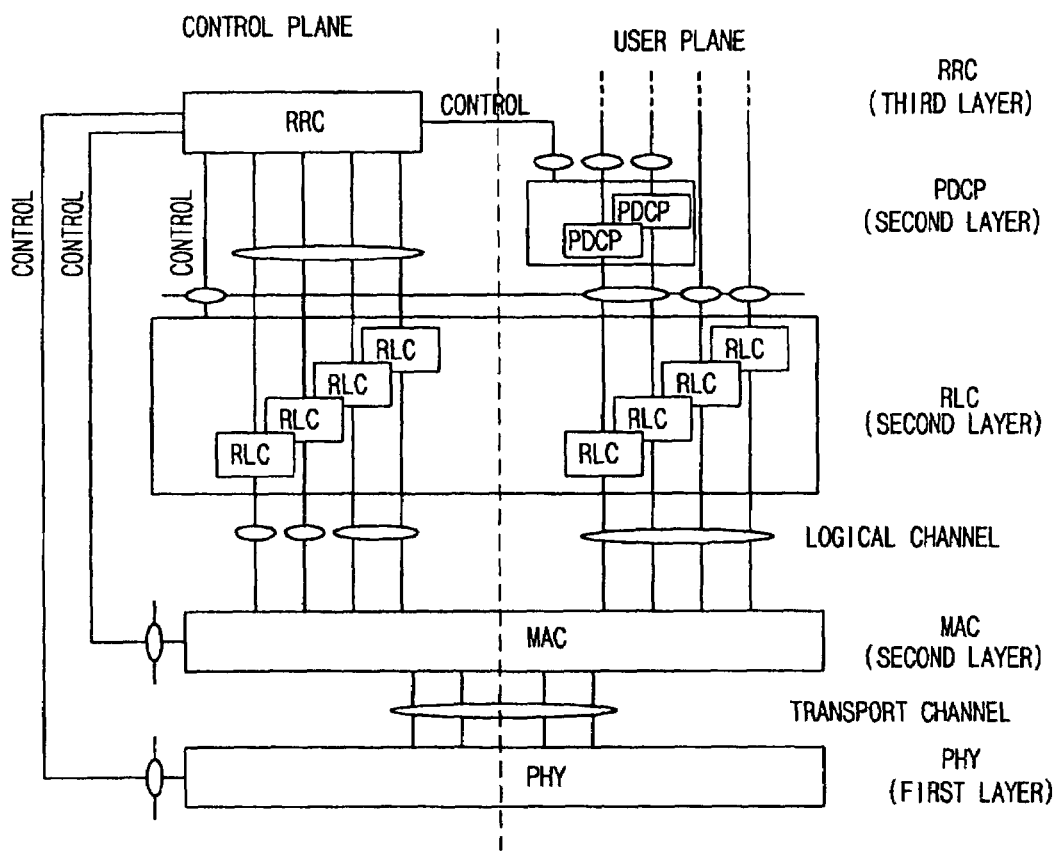
FIG. 2 is a block diagram illustrating a radio interface protocol architecture adopted or Uu interface between the UE and the UTRAN in FIG. 1.
Figure 3:
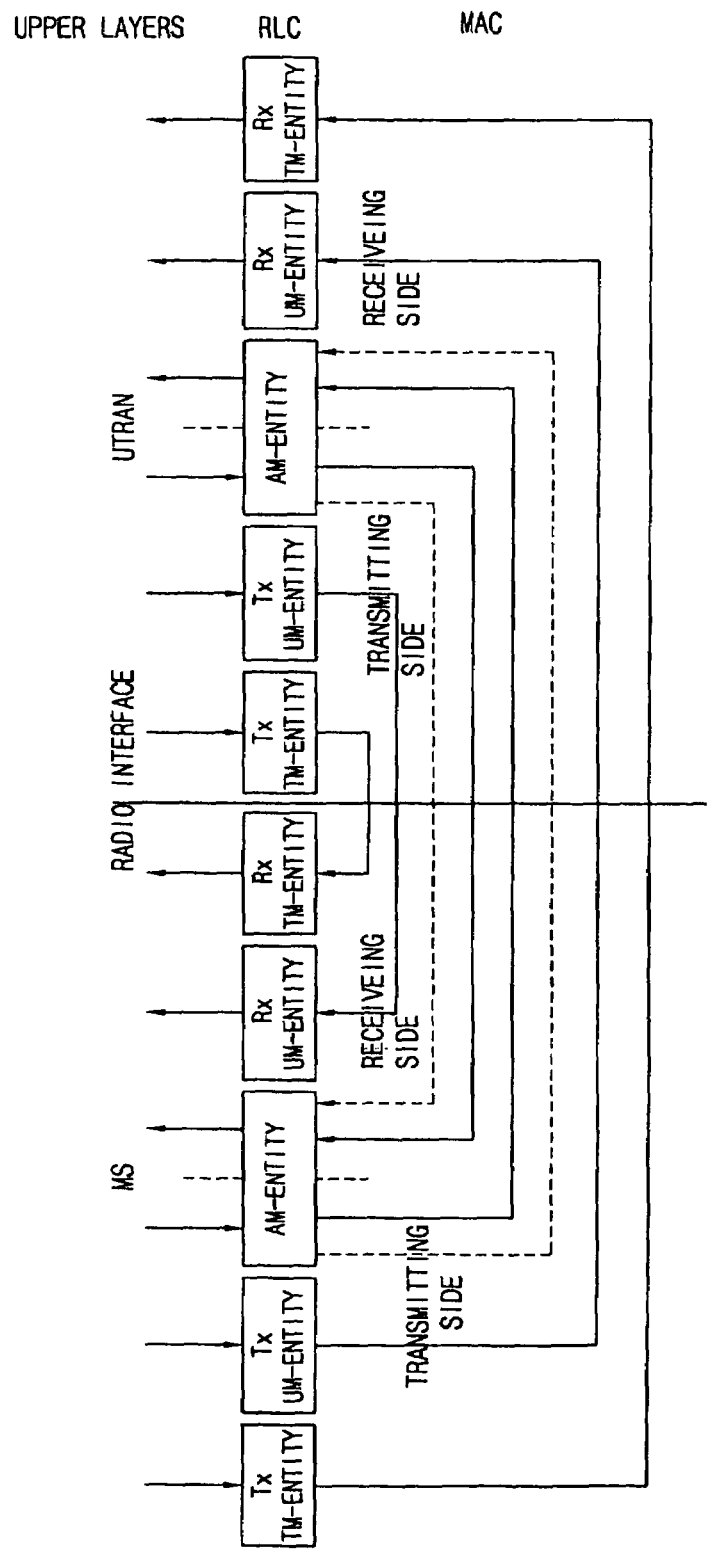
FIG. 3 is a block diagram illustrating RLC layer of the radio interface protocol architecture, of FIG. 2.
Figure 4:
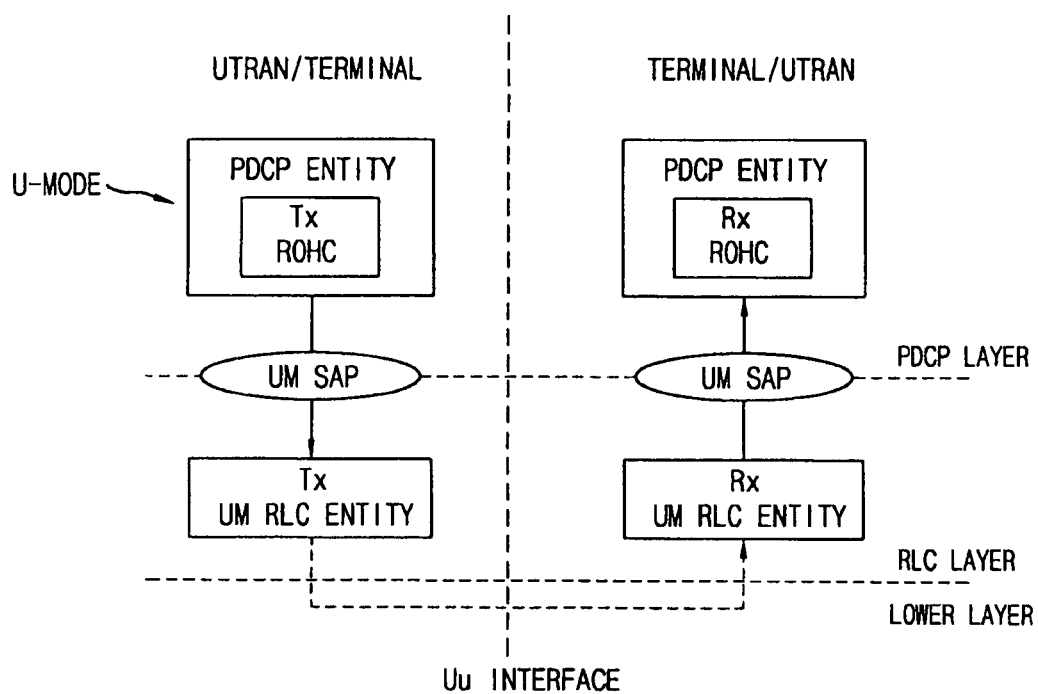
FIG. 4 is a block diagram for illustrating peer-to-peer communication between RLC entities operating in UM.
Figure 5:
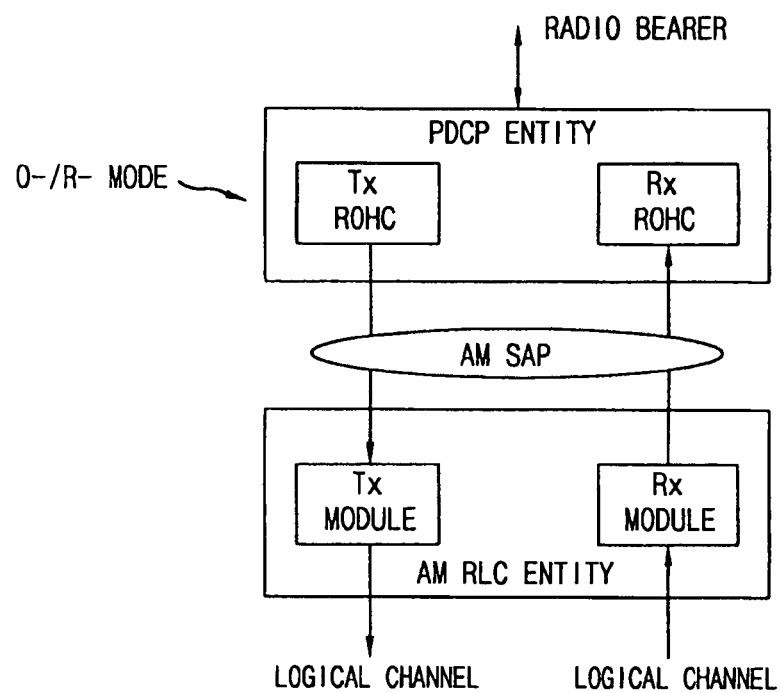
FIG. 5 is a block diagram illustrating a conventional PDCP entity-RLC entities-mapping structure in which the RLC entity operates in AM.
Figure 6:
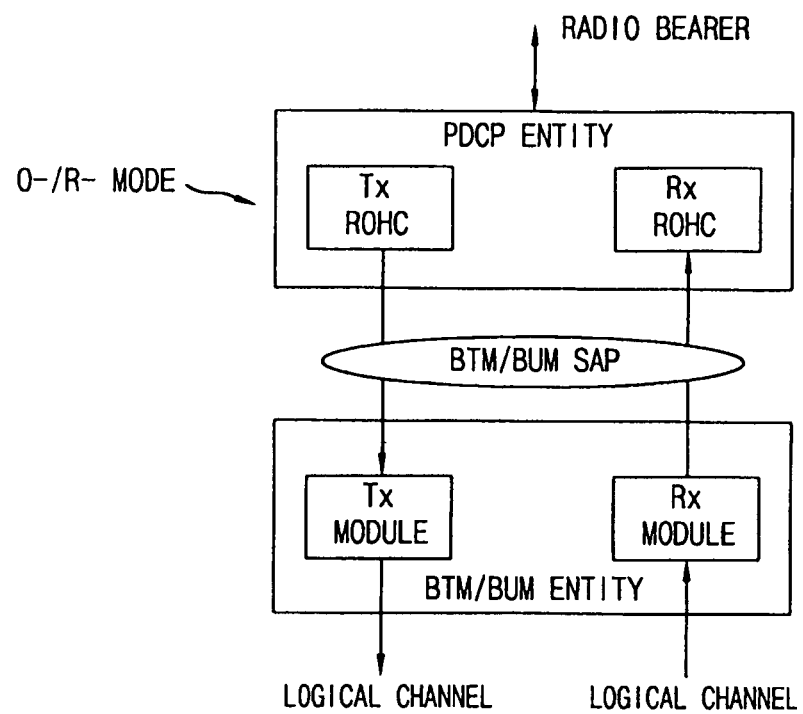
FIG. 6 is a block diagram illustrating a PDCP entity-RLC entity-mapping structure for supporting a bidirectional real time communication in a mobile communication system according to a first embodiment of the present invention.

FIG. 6 is a block diagram illustrating a PDCP entity-RLC entity-mapping structure for supporting a bidirectional real time communication in a mobile communication system according to a first embodiment of the present invention.

As shown in FIG. 6, one RB is associated with one PDCP entity located in the PDCP sublayer and the PDCP entity is associated with one bidirectional TM or UM (BTM/BUM) RLC entity located in the RLC sublayer through one BTM/BUM SAP. The BTM/BUM RLC entity is associated with the MAC sublayer through two logical channels.

The PDCP entity has a Tx ROHC module for performing header compression on a PDCP SDU received from upper layers and an Rx ROHC module for performing header decompression on PDCP PDUs delivered from lower layers.

In the present invention the ROHC protocol is used for header compression/decompression function of the PDCP entity, however, it is not limited thereto, but, various types of header compression protocols can be used according to upper layer protocols.

The BTM/BUM RLC entity includes a Tx module for transferring RLC SDU received from the PDCP entity to a transmit side logical channel and an Rx module for receiving RLC PDUs through a receive side logical channel.

The Tx ROHC module performs header compression upon reception of the PDCP SDU from upper layers and submits the PDCP PDU(s) to Tx module of the BTM/BUM RLC entity through the BTM/BUM SAP.

On the other hand, when the Rx module of the BTM/BUM RLC entity receives RLC PDUs through the receive side logical channel, the Rx module delivers the PDCP PDU (RLC SDU) to the Rx ROHC module of the PDCP entity through the BTM/BUM SAP. The Rx ROHC module performs head decompression upon reception of the PDCP PDU and then delivers the PDCP SDU to the upper layers.

Since one BTM/BUM RLC entity is provided with the Tx and Rx modules mapped to respective transmit and receive side logical channels, the BTM/BUM RLC entity can support bidirectional communication. To support the bidirectional real time services, the PDCP entity operates the ROHC in O/R mode.

The operation of the mobile communication system supporting a bidirectional real time communication by adopting the PDCP entity-RLC entity mapping structure according to the first preferred embodiment of the present invention will be described hereinafter in more detail.

It is assumed that the PDCP entity-RLC entity mapping structure of the first preferred embodiment is implemented in the radio interface protocol architecture of both the transmitter (UE or UTRAN) and receiver (UE or UTRAN).

When a packet is delivered through the RB at the transmitter, the Tx ROHC module of the PDCP entity located in the PDCP layer performs a header compression on the packet and transmits the compressed header packet to the Tx module of BTM/BUM RLC entity through the BTM/BUM SAP. The Tx module of the BTM/BUM RLC entity transfers the compressed header packet to the receiver through the lower layers.

If the receiver receives the compressed header packet, the Rx module of the BTM/BUM RLC entity of the receiver immediately delivers the compressed header packet to the Rx ROHC module of the PDCP entity. The Rx ROHC module of the PDCP entity performs header decompression on the compressed header packet so as to recover and deliver the decompressed header packet to the upper layers.

The PDCP entity of the receiver can report status information to the transmitter such that the PDCP entity of the transmitter determines a compression scheme to be used and whether or not the transmitted packet is successfully received at the receiver on the basis of the status information.

Figure 7:
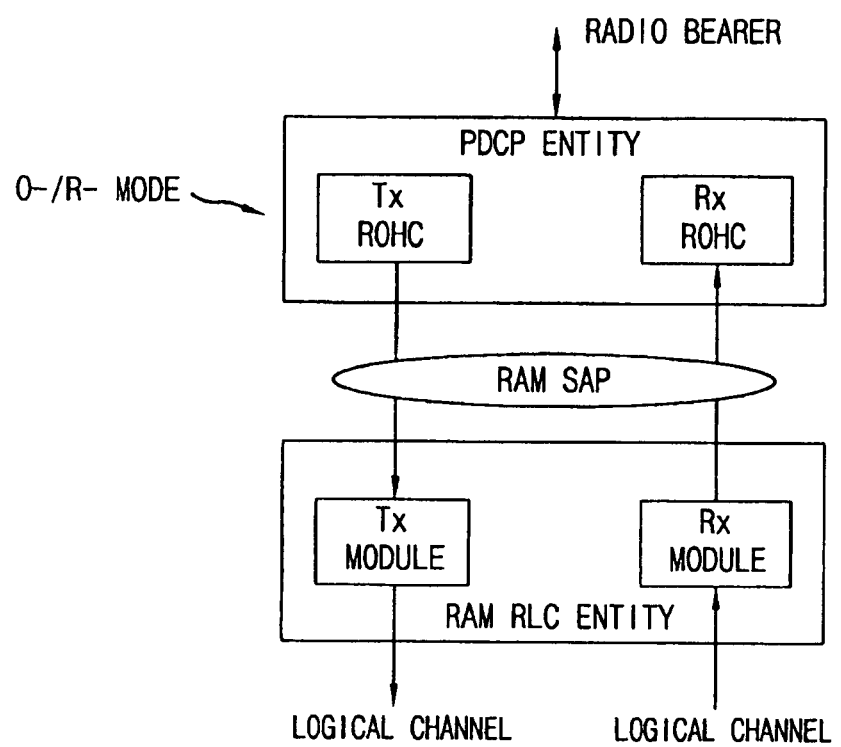
FIG. 7 is a block diagram illustrating a PDCP entity-RLC entity-mapping structure for supporting a bidirectional real time communication in a mobile communication system according to a second preferred embodiment of the present invention.

FIG. 7 is a block diagram illustrating a PDCP entity-RLC entity-mapping structure for supporting a bidirectional real time communication in a mobile communication system according to a second preferred embodiment of the present invention.

As shown in FIG. 7, one RB is associated with one PDCP entity and the PDCP entity is associated with one real time AM RLC (RAM RLC) entity through one real time AM SAP (RAM SAP). The RAM RLC entity is associated with the MAC sublayer through two logical channel.

The PDCP entity has a Tx ROHC module for performing header compression on a PDCP SDU received from upper layers and an Rx ROHC module for performing header decompression on PDCP PDUs delivered from lower layers.

The RAM RLC entity includes a Tx module for transferring RLC SDU received from the PDCP entity to a first logical channel and an Rx module for receiving RLC PDUs through a receive side logical channel.

The Tx ROHC module performs header compression upon reception of the PDCP SDU from upper layers and submits the PDCP PDU(s) to Tx module of the RAM RLC entity through the RAM SAP.

On the other hand, when the Rx module of the RAM RLC entity receives RLC PDU through the receive side logical channel, the Rx module of the RAM RLC entity delivers the PDCP PDU (RLC SDU) to the Rx ROHC module of the PDCP entity. The Rx ROHC module performs header decompression upon reception of the PDCU PDU and then delivers the PDCP SDU to the upper layers.

Since one RAM RLC entity is provided with the Tx and Rx modules mapped to respective transmit and receive side logical channels, the RAM RLC entity can support bidirectional communication. To support the bidirectional real time services, it is preferable that the PDCP entity operates the ROHC in O/R mode.

The RAM entity according to the second embodiment of the present invention is similar to the conventional AM RLC entity except that the RAM RLC entity has no retransmission function. By disabling the retransmission function, the RAM RLC entity can delivers the PDCP PDU to the upper layers without processing delay at the transmitter and receiver.

The operation of the mobile communication system supporting the bidirectional real time communication by adopting the PDCP entity-RLC entity mapping structure according to the second preferred embodiment of the present invention will be described hereinafter in more detail.

It is assumed that the PDCP entity-RLC entity mapping structure of the second preferred embodiment is implemented in the radio interface protocol architecture of both the transmitter (UE or UTRAN) and receiver (UE or UTRAN).

When a packet is delivered through the RB of the transmitter, the Tx ROHC module of the PDCP entity located in the PDCP layer performs a header compression on the packet and transmits the compressed header packet to the Tx module of the RAM RLC entity through the RAM SAP. The Tx module of the RAM RLC entity transfers the compressed header packet to the receiver through the lower layers.

If the receiver receives the compressed header packet, the Rx module of the RAM RLC entity of the receiver immediately delivers the compressed header packet to the Rx ROHC module of the PDCP entity and transmits an acknowledgement to the peer RAM RLC entity of the transmitter at the same time. The Rx ROHC module of the PDCP entity performs header decompression on the compressed header packet so as to recover and deliver the decompressed header packet to the upper layers.

Even though the RAM RLC entity of the receiver transmits the acknowledgement, the acknowledgement does not contain retransmission related information. That is, when the RLC peer entities operate in RAM, the functions and parameters associated with the packet retransmission such as in sequence delivery, retransmission timers, counters, and transmission and reception windows are disabled. By disabling the retransmission related functions, which mostly causes the processing delay at the RLC layer, is reduced such that it is possible to support real time services.

Figure 8:
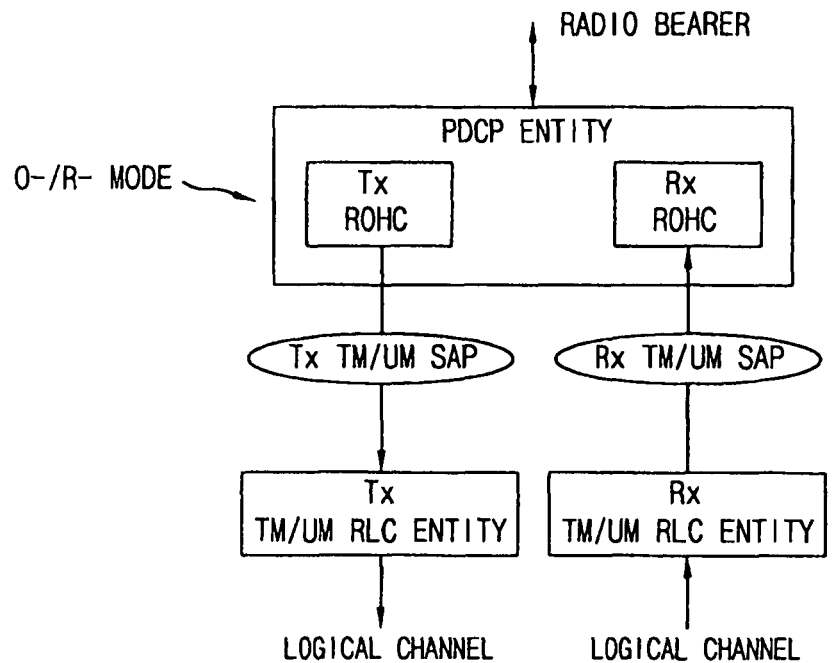
FIG. 8 is a block diagram illustrating a PDCP entity-RLC entity-mapping structure for supporting a bidirectional real time communication in a mobile communication system according to a third preferred embodiment of the present invention.

FIG. 8 is a block diagram illustrating a PDCP entity-RLC entity-mapping structure for supporting a bidirectional real time communication in a mobile communication system according to a third preferred embodiment of the present invention.

As shown in FIG. 8, one RB is associated with one PDCP entity and the PDCP entity is associated with a pair of TM or UM (TM/UM) RLC entities, i.e. Tx TM/UM RLC entity and Rx TM/UM RLC entity, through respective TM/UM SAPs. The Tx and Rx TM/UM RLC entities are mapped to respective transmit side and receive side logical channels.

The PDCP entity has a Tx ROHC module for performing header compression on a PDCP SDU received from upper layers and an Rx ROHC module for performing header decompression on PDCP PDU delivered from lower layers.

The Tx ROHC module performs header compression upon reception of the PDCU SDU from upper layers and submits the PDCP PDU(s) to the Tx TM/UM RLC entity through the Tx TM/UM SAP.

On the other hand, when the Rx TM/UM RLC entity receives RLC PDU through the receive side logical channel, the Rx TM/UM RLC entity delivers the PDCP PDU (RLC SDU) to the Rx ROHC module through the Rx TM/UM SAP. The Rx ROHC module performs header decompression upon reception of the PDCP PDU and then delivers the PDCP SDU to the upper layers.

Since one Tx TM/UM RLC entity and one Rx TM/UM RLC entity are responsible for respective transmitting and receiving RLC PUDs, it is possible to support the bidirectional communication. To support the bidirectional real time services, it is preferable that the PDCP entity operates the ROHC in O/R mode.

In this case, the TM/UM RLC entity operates in the same manner of the conventional TM/UM RLC entity except that the Tx and Rx TM/UM RLC entities simultaneously provides services to one PDCP entity mapped to one RB.

The operation of the mobile communication system supporting the bidirectional real time communication by adopting the PDCP entity-RLC entity mapping structure according to the third preferred embodiment of the present invention will be described hereinafter in more detail.

It is assumed that the PDCP entity-RLC entity mapping structure of the third preferred embodiment is implemented in the radio interface protocol architecture of both the transmitter (UE or UTRAN) and receiver (UE or UTRAN).

When a packet is delivered through the RB of the transmitter, the Tx ROHC module of the PDCP entity located in the PDCP layer performs a header compression on the packet and transmits the compressed header packet to the Tx TM/UM RLC entity through the Tx TM/UM SAP. The Tx TM/UM RLC entity transfers the compressed header packet to the receiver through the transmit side logical channel.

If the receiver receives the compressed header packet, the Rx TM/UM RLC entity of the receiver immediately delivers the compressed header packet to the Rx ROHC module of the PDCP entity. The Rx ROHC module of the PDCP entity performs header decompression on the compressed header packet so as to recover and deliver the decompressed header packet to the upper layers.

The PDCP entity of the receiver can report status information to the transmitter such that the PDCP entity of the transmitter determines a compression scheme to be used and whether or not the transmitted packet is successfully received at the receiver on the basis of the status information.

Figure 9:
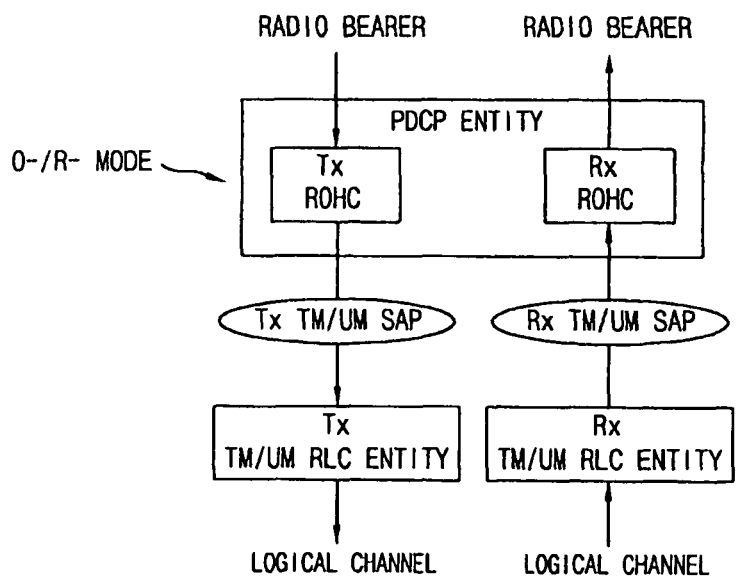
FIG. 9 is a block diagram illustrating a PDCP entity-RLC entity-mapping structure for supporting a bidirectional real time communication in a mobile communication system according to a fourth preferred embodiment of the present invention.

FIG. 9 is a block diagram illustrating a PDCP entity-RLC entity-mapping structure for supporting a bidirectional real time communication in a mobile communication system according to a fourth preferred embodiment of the present invention.

As shown in FIG. 9, two RBs are associated with one PDCP entity and the PDCP entity is associated with a pair of TM or UM (TM/UM) RLC entities, i.e. Tx TM/UM RLC entity and Rx TM/UM RLC entity, through respective TM/UM SAPs. The Tx and Rx TM/UM RLC entities are mapped to respective transmit side and receive logical channels.

In this embodiment, the two RBs have unidirectional characteristics and are regarded as transmit RB and receive RB, respectively. However, the present invention is not limited only to this configuration, but, the two RBs can be changed so as to have bidirectional characteristics together with the modification of the other parts cooperating therewith.

The PDCP entity has a Tx ROHC module for performing header compression on a PDCP SDU received from upper layers and an Rx ROHC module for performing header decompression on PDCP PDU delivered from lower layers.

The Tx ROHC module performs header compression upon reception of PDCP SDU form upper layers through the transmit side RB and submits the PDCP PDU to the Tx TM/UM RLC entity through the Tx TM/UM SAP.

On the other hand, when the Rx TM/UM RLC entity receives RLC PDU through the receive side logical channel, the Rx TM/UM RLC entity delivers the PDCP PDU (RLC SDU) to the Rx ROHC module through the Rx TM/UM SAP. The Rx ROHC module performs header decompression upon reception of the PDCP PDU and then delivers the PDCP SDU to the upper layers through the receive side RB.

Since one Tx TM/UM RLC entity and one Rx TM/UM RLC entity are responsible for respective transmitting and receiving RLC PDUs, it is possible to support the bidirectional communication. To support the bidirectional real time services, it is preferable that the PDCP entity operates in the ROHC in O/R mode.

Similar to the third preferred embodiment, the Tx and Rx TM/UM RLC entities simultaneously provides services to the one PDCP. However, in the fourth embodiment the Tx ROHC module of the PDCP entity is mapped to the transmit side RB and the Rx ROHC module of the PDCP entity is mapped to the receive side RB.

The operation of the mobile communication system supporting the bidirectional real time communication by adopting the PDCP entity-RLC entity-mapping structure according to the fourth preferred embodiment of the present invention will be described hereinafter in more detail.

It is assumed that the PDCP entity-RLC entity mapping structure of the fourth preferred embodiment is implemented in the radio interface protocol architecture of both the transmitter (UE or UTRAN) and receiver (UE or UTRAN).

When a packet is delivered through the transmit side RB at the transmitter, the Tx ROHC module of the PDCP entity located in the PDCP layer performs header compression on the packet and transmits the compressed header packet to the Tx TM/UM RLC entity through the Tx TM/UM SAP. The Tx T M/UM RLC entity transfers the compressed header packet to the receiver through the transmit side logical channel.

If the receiver receives the compressed header packet, the Rx TM/UM RLC entity of the receiver immediately delivers the compressed header packet to the Rx ROHC module of the PDCP entity. The Rx ROHC module of the PDCP entity performs header decompression on the compressed header packet so as to deliver the decompressed header packet to the upper layers through the receive side RB.

The PDCP entity of the receiver can report status information to the transmitter such that the PDCP entity of the transmitter determines a compression scheme to be used and whether or not the transmitted packet is successfully received at the receiver on the basis of the status information.

As described above, in one aspect of the PDCP entity-to-RLC entity mapping structure according to the mobile communication method and system of the present invention, since each of the PDCP peer entities at the transmitter and receiver has a transmit side ROHC and receive side ROHC modules operating in O/R mode and is mapped one RLC entity which can simultaneously activate a pair of transmit and receive modules mapped to different logical channels in transparent mode (TM) or unacknowledged mode (UM), the PDCP entity can support bidirectional real time services to the upper layers even in the transparent mode or unacknowledged mode.

In another aspect of the PDCP entity-to-RLC entity mapping structure according to the mobile communication method and system of the present invention, since each of the PDCP peer entities at the transmitter and receiver has a transmit side ROHC and receiver side ROHC modules operating in O/R mode and is mapped one RLC entity which disables the retransmission function in the acknowledgement mode (AM), the PDCP entity can support bidirectional real time service to the upper layers even in acknowledged mode.

In another aspect of the PDCP entity-to-RLC entity mapping structure according to the mobile communication method and system of the present invention, since each of the PDCP peer entities at the transmitter and receiver has a transmit side ROHC and receiver side ROHC modules operating in O/R mode and is mapped to two RLC entities responsible for packet transmission and reception, respectively, in the transparent mode or unacknowledged mode, the PDCP entity can support bidirectional real time service to the upper layer even in the transparent mode or unacknowledged mode.

In still another aspect of the PDCP entity-to-RLC entity mapping structure according to the mobile communication method and system of the present invention, since each of the PDCP peer entities at the transmitter and receiver is associated two radio bearers, one for transmit side and the other for receive side, and mapped to two RLC entities responsible for packet transmission and reception, respectively, in the transparent mode or unacknowledged mode, the PDCP entity can support bidirectional real time service to the upper layer even in the transparent mode or unacknowledged mode.

In the present invention, since one or two RLC entities are responsible for bidirectional two way communication, it is possible to support bidirectional real time services in packet-switched domain as well as circuit-switched domain.

While this invention has been described in connection with what is presently considered to be the most practical and preferred embodiments, it is to be understood that the invention is not limited to the disclosed embodiments, but, on the contrary, is intended to cover various modification and equivalent arrangements included within the spirit and scope of the appended claims.

What is claimed is:

1. In a wireless communication system that employs a layered radio interface protocol, an apparatus comprising:
a packet data convergence protocol (PDCP) entity associated with a layer of the radio interface protocol, the PDCP entity being further associated with one or two radio bearers; and
one or two radio link control (RLC) entities associated with another layer of the radio interface protocol, the one or two RLC entities in communication with the PDCP entity;
wherein one RLC entity is communicated with the PDCP entity when the RLC entity is in an Acknowledged Mode (AM), and
wherein two RLC entities are communicated with the PDCP entity when the RLC entities are in a Transparent Mode (TM) or an Unacknowledged Mode (UM).

2. The apparatus of claim 1, wherein the PDCP entity is associated with two radio bearers, a first radio bearer supporting the transmission of packets to the PDCP entity from a higher layer, and a second radio bearer supporting the transmission of packets from the PDCP entity to a higher layer.

3. The apparatus of claim 1, wherein there are two radio bearers and the transfer of packets between the two layers is bidirectional.

4. The apparatus of claim 1, further comprising one or two service access points through which packets are transferred between the PDCP entity and the one or two RLC entities.

5. In a wireless communication system that employs a layered radio interface protocol, an apparatus comprising:
a first entity associated with a layer of the radio interface protocol, the first entity being further associated with one or two radio bearers; and
one or two second entities associated with another layer of the radio interface protocol, the one or two second entities in communication with the first entity;
wherein the number of second entities depends upon a mode of radio bearer associated with the first entity,
wherein one or more service access points through which packets are transferred between the first entity and the one or two second entities,
wherein there are two radio bearers, two second entities and two service access points, wherein a first one of the radio bearers, a first one of the second entities and a first one of the service access points support packet transfer in a first direction between the layers, and wherein a second one of the radio bearers, a second one of the second entities and a second one of the service access points support packet transfer in a second direction between the layers.

6. The apparatus of claim 5, wherein the two second entities are configured to operate in transfer mode.

7. The apparatus of claim 5, wherein the two second entities are configured to operate in unacknowledged mode.

8. The apparatus of claim 5, wherein the service access points are transport mode service access points.

9. The apparatus of claim 5, wherein the service access points are unacknowledged mode service access points.

10. The apparatus of claim 5, wherein the first entity is a packet data convergence protocol (PDCP) layer entity.

11. The apparatus of claim 5, wherein the two second entities are radio link control (RLC) entities.

12. In a wireless communication system that employs a layered radio interface protocol, an apparatus comprising:
a packet data convergence protocol (PDCP) entity associated with a layer of the radio interface protocol, the PDCP entity further associated with a radio bearer; and
one or two radio link control (RLC) entities associated with another layer of the radio interface protocol, the one or two RLC entities in communication with the PDCP entity;
wherein one RLC entity is communicated with the PDCP entity when the RLC entity is in an Acknowledged Mode (AM), and
wherein two RLC entities are communicated with the PDCP entity when the RLC entities are in a Transparent Mode (TM) or an Unacknowledged Mode (UM).

13. The apparatus of claim 12, further comprising one or two service access points through which packets are transferred between the PDCP entity and the one or two RLC entities.

14. The apparatus of claim 13, wherein the packets are transferred between the two layers in a first direction and a second direction.

* * * * *